US012768103B2

(12) United States Patent
Francino

(10) Patent No.: US 12,768,103 B2
(45) Date of Patent: Oct. 20, 2026

(54) HEALTH ASSESSMENT OF A MECHANICAL SYSTEM

(71) Applicant: Schneider Electric Systems USA, Inc., Foxboro, MA (US)

(72) Inventor: Peter Francino, Renfrew, PA (US)

(73) Assignee: Schneider Electric Systems USA, Inc., Foxborough, MA (US)

( * ) Notice: Subject to any disclaimer, the term of this patent is extended or adjusted under 35 U.S.C. 154(b) by 0 days.

(21) Appl. No.: 18/633,017

(22) Filed: Apr. 11, 2024

(65) Prior Publication Data

US 2024/0254691 A1 Aug. 1, 2024

Related U.S. Application Data

(63) Continuation of application No. 17/218,705, filed on Mar. 31, 2021, now Pat. No. 11,976,419.

(51) Int. Cl.
*D21C 7/16* (2006.01)
*G07C 3/00* (2006.01)

(52) U.S. Cl.
CPC ............... *D21C 7/16* (2013.01); *G07C 3/005* (2013.01)

(58) Field of Classification Search
CPC ................................ D21C 7/16; G07C 3/005; G05B 2219/24019; G05B 23/0283; (Continued)

(56) References Cited

U.S. PATENT DOCUMENTS

2005/0013753 A1 1/2005 Eaton et al.
2017/0132387 A1 5/2017 Lin et al.
(Continued)

FOREIGN PATENT DOCUMENTS

CN 111080072 A 4/2020
CZ 111797815 A 10/2020

OTHER PUBLICATIONS

AVEVA Brochure, "AVEVA Predictive Analytics," downloaded from website: sw.aveva.com/asset-performance/asset-ýanalysis/predictive-asset-analytics, Copyright © 2020 AVEVA Group plc and its subsidiaries.

(Continued)

*Primary Examiner* — Lee E Rodak
*Assistant Examiner* — Byung Ro Lee
(74) *Attorney, Agent, or Firm* — Wolf, Greenfield & Sacks, P.C.

(57) ABSTRACT

A method is provided for assessing health of a mechanical system. The method includes receiving discontinuous system data that is obtained intermittently and is associated with health of the system and generating a discontinuous health index that is based on the discontinuous system data and receiving continuous system data that is obtained continuously and is associated with the health of the system and generating a continuous health index that is based on the continuous system data, wherein the discontinuous health index and the continuous health index are configured to be combinable. The method further includes combining the discontinuous health index and the continuous health index, generating an overall health index based on the combination of the discontinuous health index and the continuous health index, and automatically taking one or more actions to maintain or improve health of the mechanical system and/or avoid risk based on the overall health index.

20 Claims, 6 Drawing Sheets

(58) Field of Classification Search
CPC ............... G06Q 10/0635; G06Q 10/04; G06Q 10/06393; G06Q 50/02; G06Q 50/04; G01M 99/00
See application file for complete search history.

(56) References Cited

U.S. PATENT DOCUMENTS

| | | | | |
|---|---|---|---|---|
| 2018/0059691 | A1* | 3/2018 | Fleming ................. | G06Q 50/02 |
| 2018/0165592 | A1 | 6/2018 | Huang et al. | |
| 2020/0050990 | A1 | 2/2020 | Kim et al. | |
| 2020/0116553 | A1 | 4/2020 | Hsia et al. | |
| 2020/0134516 | A1 | 4/2020 | Lyu et al. | |
| 2020/0269995 | A1 | 8/2020 | Beaven et al. | |

OTHER PUBLICATIONS

Extended European Search Report for European Patent Application No. EP22154988.4, dated Jul. 19, 2022.

* cited by examiner

HEALTH ASSESSMENT OF A MECHANICAL SYSTEM

CROSS-REFERENCE TO RELATED APPLICATIONS

This patent is a continuation of U.S. patent application Ser. No. 17/218,705 (now U.S. Pat. No. 11,976,419), filed on Mar. 31, 2021, entitled "HEALTH ASSESSMENT OF A MECHANICAL SYSTEM."

TECHNICAL FIELD

The present disclosure relates to health assessment of a mechanical system and more particularly, to utilizing discontinuous obtained data for the health assessment.

BACKGROUND

Preventative maintenance and condition monitoring can be used to monitor mechanical systems at periodic or aperiodic times, generating discontinuous data. For example, nondestructive test (NDT) inspections can be performed at discrete times, entailing performance of various checklist inspection items. Some examples of NDT inspections include infrared imaging, ultrasonic thickness measurement surveys, crack indication detections (e.g., using magnetic particle inspection), etc. An inspections can indicate the onset of a problem, such as when a threshold variable is exceeded. However this discontinuous type of monitoring by itself can be insufficient to avert failure of the mechanical system. A mechanical system can fail even when all items of the checklist indicate satisfactory performance.

Pressurized vessels are examples of mechanical systems that are monitored using maintenance and condition monitoring. A failure of a pressurized vessel can be dangerous and catastrophic. Accordingly, it would be beneficial to improve monitoring of mechanical systems rather than rely alone on discontinuous preventative maintenance and condition monitoring.

While conventional methods and systems have generally been considered satisfactory for their intended purpose, there is still a need in the art for improved health assessments of mechanical systems that are traditionally monitored by discontinuous preventative maintenance and condition monitoring. The present disclosure provides a solution.

SUMMARY

The purpose and advantages of the below described illustrated embodiments will be set forth in and apparent from the description that follows. Additional advantages of the illustrated embodiments will be realized and attained by the devices, systems and methods particularly pointed out in the written description and claims hereof, as well as from the appended drawings. To achieve these and other advantages and in accordance with the purpose of the illustrated embodiments, in one aspect, disclosed is a computer-implemented method for assessing health of a mechanical system. The method includes receiving discontinuous system data that is obtained intermittently and is associated with health of the system, generating a discontinuous health index that is based on the discontinuous system data, receiving continuous system data that is obtained continuously and is associated with the health of the system, and generating a continuous health index that is based on the continuous system data. The discontinuous health index and the continuous health index are configured to be combinable. The method further includes combining the discontinuous health index and the continuous health index, which includes combining one or more discontinuous health indexes generated over time and once or more continuous health indexes generated over time. The method further includes generating an overall health index based on the combination of the discontinuous health index and the continuous health index, and automatically taking one or more actions to maintain or improve health of the mechanical system and/or avoid risk based on the overall health index.

In one or more embodiments, combining the discontinuous system data and the continuous system data can include applying a combinatory method for combining the one or more discontinuous and continuous health indexes generated over time.

In one or more embodiments, the method can further include capturing at least one of the discontinuous system data and the continuous system data.

In one or more embodiments, the one or more actions can include adjusting the manner in which the discontinuous system data and/or the continuous system data is captured.

In one or more embodiments, the one or more actions can include performing an emergency shutdown of relevant equipment associated with the mechanical system to avoid the risk.

In one or more embodiments, the one or more actions can include providing a notification to a system user or operator indicating a change in the assessment of the health of the mechanical system and/or a recommendation for responding to the change in the assessment of the health of the mechanical system.

In one or more embodiments, the overall health index can be represented as a score, and combining the discontinuous health index and the continuous health index into an overall health index can further include combining one or more previously determined overall health indexes, wherein generating the overall health index can be based on the combination of the discontinuous health index, the continuous health index, and the previously determined overall health index.

In one or more embodiments, the method can further include updating the discontinuous health index in real time in response to receipt of discontinuous system data as new discontinuous system data is received, and updating the overall health index in real time in response to the update to the discontinuous health index.

In one or more embodiments, the method can further include determining at least one of a discontinuous confidence indicator (DC-CI) and a continuous confidence indicator (C-CI). The DC-CI indicates a level of confidence in at least one of the received discontinuous system data and the determined discontinuous health index. The C-CI indicates a level of confidence in at least one of the received continuous system data and the determined continuous health index. The method can further include generating an overall confidence indicator (O-CI) that is a function of at least one of the DC-CI and the C-CI and/or trends of at least one of the DC-CI and C-CI. A determination whether to automatically take the one or more actions and/or a selection of the one or more actions to take can be based on the O-CI and/or changes in the O-CI.

In one or more embodiments, the combinatory method for combining the discontinuous and continuous health indexes applies weights to each of the discontinuous system data and the continuous system data.

In one or more embodiments, the weights applied to the discontinuous and continuous health indexes are dynamically determined as a function of DC-CI and the C-CI, respectively. In accordance with a further aspect of the disclosure, a health assessment system for assessing health of a mechanical system is provided. The health assessment system includes a memory configured to store a plurality of programmable instructions and at least one processing device in communication with the memory, wherein the at least one processing device, upon execution of the plurality of programmable instructions is configured to perform the disclosed method.

In one or more embodiments, the mechanical system can be associated with an industrial process.

In one or more embodiments, the mechanical system can include a pressurized vessel. In one or more embodiments, the pressurized vessel can be a pulp digester associated with a paper manufacturing process.

In accordance with still a further aspect of the disclosure, a non-transitory computer readable storage medium having one or more computer programs embedded therein, which when executed by a computer system, cause the computer system to perform the disclosed method.

BRIEF DESCRIPTION OF THE DRAWINGS

A more detailed description of the disclosure, briefly summarized above, may be had by reference to various embodiments, some of which are illustrated in the appended drawings. While the appended drawings illustrate select embodiments of this disclosure, these drawings are not to be considered limiting of its scope, for the disclosure may admit to other equally effective embodiments.

Identical reference numerals have been used, where possible, to designate identical elements that are common to the figures. However, elements disclosed in one embodiment may be beneficially utilized on other embodiments without specific recitation.

DETAILED DESCRIPTION

Figure 1:
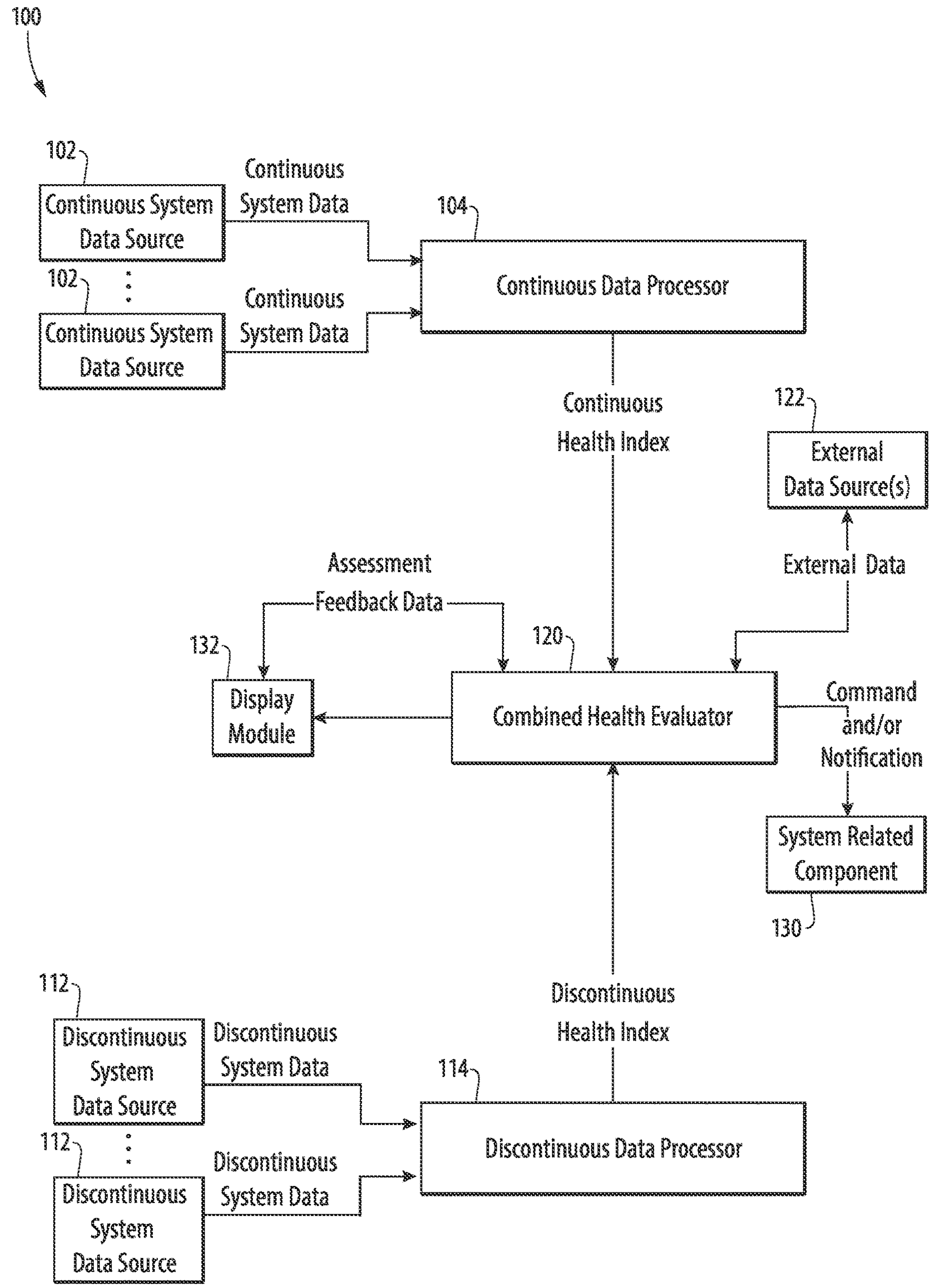
FIG. 1 is a block diagram illustrating an example health assessment system, in accordance with embodiments of the disclosure.

Reference will now be made to the drawings wherein like reference numerals identify similar structural features or aspects of the subject disclosure. For purposes of explanation and illustration, and not limitation, a schematic diagram of an exemplary embodiment of a health assessment system in accordance with the disclosure is shown in FIG. 1 and is designated generally by reference character 100. Other embodiments of a health assessment system in accordance with the disclosure, or aspects thereof, are provided in FIGS. 2-6, as will be described.

Health assessment system 100 includes one or more continuous system data sources 102 and one or more discontinuous system data sources 112 that respectively sense and output continuous system data and discontinuous system data that are related to a mechanical system that is being assessed for health. The mechanical system can be, for example, a pressurized vessel, boiler tubing system, a feed water heater, a heat recovery steam generator, a fermentation or biological reactor, and a catalyst cracker, e.g., in a refinery.

The continuous system data is provided to a continuous data processor 104 that outputs a continuous health index. The discontinuous system data is provided to a discontinuous data processor 114 that outputs a discontinuous health index. A combined health evaluator 120 evaluates the continuous health index and the discontinuous health index by applying a combinatorial algorithm. The combined health evaluator 120 can further receive external data from one or more external data sources 122 and apply the external data to the combinatorial algorithm or its result. The external data can be applied before, during, or after performance of the combinatorial algorithm.

A fault-free evaluation of the mechanical system can be performed under fault-free conditions to obtain fault-free continuous system data and/or discontinuous system data under fault-free conditions. The fault-free evaluation can be physically performed or simulated, for example, when the mechanical system is new, freshly serviced, etc. The continuous health index can be a function of a comparison between the fault-free continuous system data and continuous system data obtained during operation of the mechanical system as it is being monitored. Similarly, the discontinuous health index can be a function of a comparison between the fault-free discontinuous system data and discontinuous system data obtained during operation of the mechanical system as it is being monitored. In one or more embodiments, the fault-free discontinuous system data can be categorized as being fault-free when certain conditions are satisfied. For example, thermal variations of a thermal image that are less than a predetermined threshold indicative of minimal variation, or mean and standard deviation of a distribution of measurements of a magnetic particulate crack that are within a predetermined range indicative of low disbursement can be indications of fault-free discontinuous system data.

Continuous data processor 104, discontinuous data processor 114, and combined health evaluator 120 are implemented on one or more computer systems, and can be integrated in a single device (e.g., housed in the same housing) or provided in one or more separate devices. Any of continuous data processor 104, discontinuous data processor 114, and combined health evaluator 120 can share one or more components and/or functions, or can be entirely discreet from one another.

Combined health evaluator 120 assesses health of the mechanical system based on the output of the combinatorial algorithm, which can optionally include application of the external data. The health assessment can be performed by applying a health assessment algorithm. Output of the health assessment algorithm can be represented as a health assessment score. The health assessment score can include one or more scores that represents respective characteristics of the mechanical system and/or an overall score representative of overall health of the mechanical system.

Based on the health assessment score, the combined health evaluator 120 outputs commands and or notifications to a system related component 130. The commands and notifications can cause the system related component 130 to take one or more automatic actions to maintain or improve health of the mechanical system and/or avoid risk. The actions can include, for example, performing an emergency shutdown of relevant equipment associated with the mechanical system to avoid the risk or adjusting a manner in which the discontinuous system data and/or the continuous system data is captured by the respective discontinuous system data sources 112 and/or continuous system data sources 102. Furthermore, the actions can include displaying and/or announcing a notification to a system user or operator that indicates a change in the assessment of the health of the mechanical system and/or a recommendation for responding to the change in the assessment of the health of the system. An example recommendation could include a sounding of alarms and flashing lights to alert personnel in the vicinity to evacuate the area. Another example recommendation could be notification that conditions have stabilized such that it is safe to return to the area.

In one or more embodiments, the health assessment score can be output as assessment feedback data that is provided as input to the combined health evaluator 120. In this way, the combined health evaluator 120 processes the assessment feedback data with a next iteration of application of the health assessment algorithm, as applied to output of the combinatorial algorithm's combination of later received continuous and discontinuous health indices. The assessment feedback data can be applied to the health assessment algorithm before, during, or after performance of the health assessment algorithm.

The continuous system data sources 102 can include, for example, video cameras, temperature sensors, flow sensors, pressure sensors, PH sensors, speed sensors, chemical concentration sensors, imagers, e.g., in the infrared or visible spectrum, vibration sensors, etc. that continually monitor the mechanical system and output continuous system data. The output of each continuous system data source 102 can provide a continuous system data channel.

Continuous system data sources 102 can be permanently installed. Furthermore, continuous system data sources can continuously sense in real time during operation of the mechanical system, as opposed to in conjunction with a specific inspection or test. The continuous system data can be raw data or can be processed data. Processing of the continuous system data can be performed by the continuous system data source using an intermediate device. The processing can include, for example, aggregation, conversion from analog to digital, strengthening or filtering using signal processing techniques, etc.

Continuous data processor 104 evaluates the continuous system data received and outputs a continuous health index that is a function of the continuous system data channels, providing a quantitative measure of health of the mechanical system based on the continuous system data.

Figure 2:
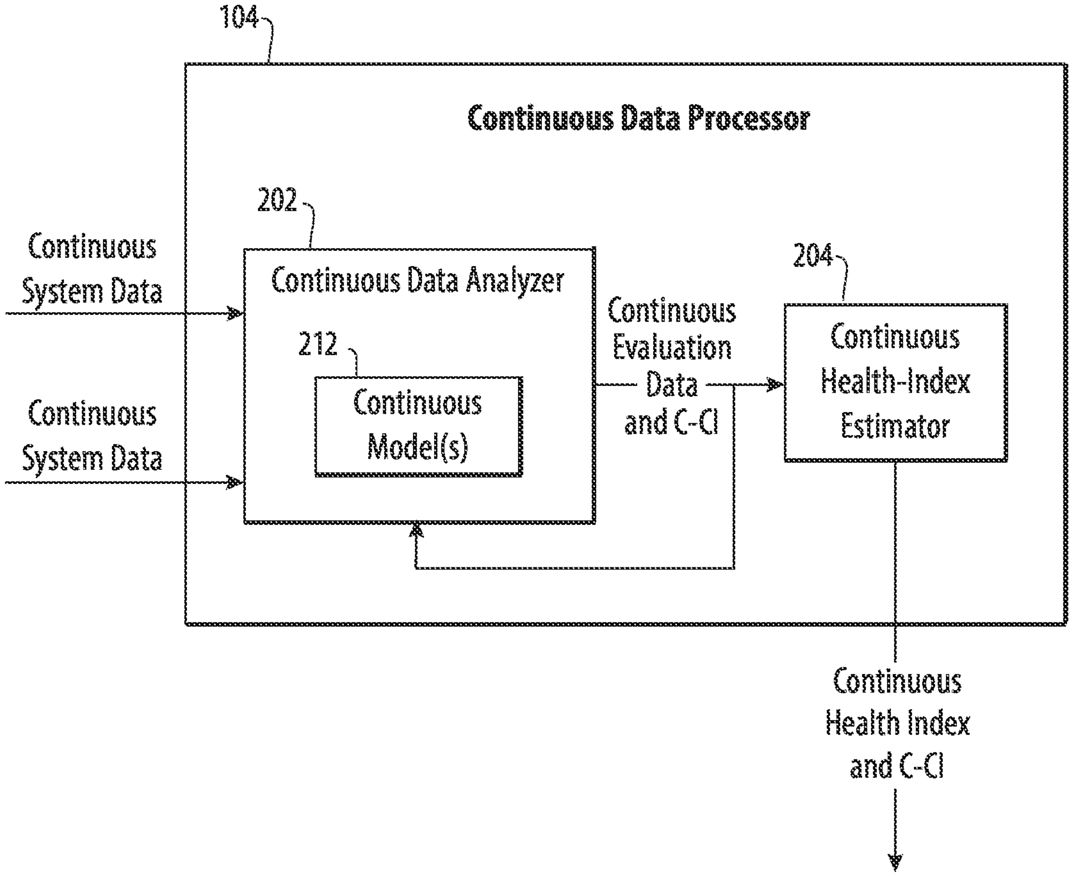
FIG. 2 is a block diagram illustrating an example continuous data processor shown in FIG. 1, in accordance with embodiments of the disclosure.

With reference to FIG. 2, the continuous data processor 104 includes a continuous data analyzer 202 and a continuous health-index estimator 204. Continuous data analyzer 202 receives the continuous system data from continuous system data sources 102. Continuous data analyzer 202 applies algorithms and/or models, such as continuous models 212, to the continuous system data and outputs continuous evaluation data. Without limitation to a particular device or technique, continuous data analyzer 202 can be implemented, for example, as AVEVA™ Predictive Analytics Software (previously known as PRISM Predictive Asset Analytics). General Electric™ Predix™ and Siemens™ MindSphere™.

Continuous data analyzer 202 can apply one or more algorithms using continuous models 212, such as statistical analysis, probabilistic analysis, machine learning, or numerical solver techniques. Numerical solver techniques can apply an objective function to compare the continuous system data to an optimal operating point. The numerical solver techniques can include one or more of a least squares technique, a linear programming (LP) technique, a quadratic programming technique, a regression technique, a mixed integer linear programming technique, a mixed integer nonlinear programming technique, etc. Output from the continuous models is output as continuous evaluation data. The continuous evaluation data can be provided as feedback to the continuous data analyzer 202, such as for detecting trends.

Continuous health-index estimator 204 receives and processes the continuous evaluation data and transforms it into a continuous health index, which is a numerical value that represents health of the mechanical system as indicated by the continuous system data. The continuous health index is provided in a predetermined format that is compatible with the combined health evaluator 120. Continuous health-index estimator 204 can be determined in real time as the continuous system data is received.

A continuous confidence indicator (C-CI) is determined that indicates a level of confidence in the continuous system data and the continuous evaluation data determined therefrom. The C-CI can be conceived of as a measure of +/−variability associated with the continuous health index. Techniques for determining the C-CI can include, for example, statistical techniques, application of business rules, etc.

The C-CI can be decreased, for example, when confidence is decreased due to unexpected variability detected in the continuous system data in view of historical continuous system data as indicated by the feedback of the continuous evaluation data.

The C-CI can also be affected by positive or negative changes in an envelope of range values for a combination of measurements of physical characters of the continuous system data that correlate with stability, much as a flight envelope that indicates aerodynamic stability. The C-CI can be increased when the continuous system data is consistent with expectations and/or the continuous system data is relatively high in resolution. The C-CI can be decreased when the envelope diverges from stable conditions, the continuous system data is inconsistent with expectations, and/or the continuous system data is low in resolution.

The C-CI can be provided as feedback to continuous data analyzer 202 to detect trends in the C-CI, such as a decrease in C-CI, which could be attributed to possible errors in the continuous system data or possible errors in the techniques used by continuous data analyzer 202 to analyze the continuous system data. As the C-CI decreases (indicating a decrease in confidence of the continuous health index), next and subsequent calculations of the continuous health index can be decreased in importance, such as by adjusting a weight applied to the continuous health index for future calculations. With returned reference to FIG. 1, the discontinuous system data sources 112 can include, for example, a camera (that acquires still photographs or video), acoustic sensor, thermal sensor, thermal imager, X-ray imager, a pressure sensor, a spectrometer, a current sensor, an ultrasonic sensor, lab results, such as for measuring metallurgical properties or a pulp Kappa number, a manually or automatically generated checklist with data entered therein, without limitation. The output of each discontinuous system data source 112 can provide a discontinuous system data channel.

The discontinuous system data sources 112 provide discontinuous system data to discontinuous data processor 114 with intervals in between provision of the data. The discontinuous system data sources 112 can be activated to sense or measure physical properties, or obtain manually entered data, during periodic or aperiodic inspection procedures. Inspection procedures can be obtained by administering a test, such as using nondestructive testing methods, which can involve application of an energy field, energy pulses, a fluid, etc., and sensing, measuring, and/or observing a physical characteristic of the mechanical system as it responds.

As opposed to the continuous system data, the discontinuous system data is obtained intermittently. Different types of discontinuous system data can be obtained by administering different tests. The tests can be performed individually at different times by different entities. Results of the various tests can be compared to various thresholds to determine whether there is degradation in health of the mechanical system. Under certain circumstances, individual test may fail to indicate degradation in health, whereas a combination of these individual results may be indicative that a health degradation has taken place. Furthermore, even when a combination of the discontinuous system data sensors 112 do not output results that are indicative of a health degradation, a health degradation can be noticed based on discontinuous system data from one or more of the discontinuous system data sources 112 in combination with output from the continuous system data sources 102.

Discontinuous data processor 114 receives and evaluates the discontinuous system data. An individual discontinuous health score can be generated for each discontinuous system data channel, e.g., as a function of fault-free discontinuous system data that corresponds to the particular discontinuous system data channel. The discontinuous data processor 114 can calculate and output a discontinuous health index as a function of the individual discontinuous health scores, e.g., a weighted average. The discontinuous health index provides a quantitative measure of health of the mechanical system based on the discontinuous system data.

The continuous and discontinuous health indexes are provided to combined health evaluator 120. The continuous and discontinuous health indexes can be combined by combined health evaluator 120 to generate an overall assessment of health of the mechanical system. The overall health assessment can be output, such as to display module 132 for display. In addition, the overall health assessment can be output as assessment feedback data to combined health evaluator 120, such as for tracking historical health assessments, comparing to historical health assessments, and/or detecting trends.

The overall health assessments can be evaluated by the combined health evaluator 120 to determine whether an action needs to be taken, such as to maintain or improve health of the mechanical system, avoid risk, and/or gather additional continuous or discontinuous system data. When it is determined that an action needs to be taken, combined health evaluator 120 submits a command and/or notification to a system related component 130. When it is determined that an action needs to be taken, combined health evaluator 120 submits a command and/or notification to a system related component 130. For example, a command can be sent to shut down one or more components of the mechanical system. In another example, maintenance or servicing for a component of the mechanical system can be requested. In a further example, an alarm can be activated to warn individuals to evacuate the vicinity of the mechanical system. In still a further example, a command can be issued to commission additional continuous or discontinuous system data sources or to change settings (e.g., sensitivity or resolution) of an existing continuous system data source 102 and a discontinuous system data source 112.

In addition, external data sources 122 can directly provide external data to combined health evaluator 120 that is additional to the continuous and discontinuous system data. The external data sources 122 can be external to the mechanical system or external to a network used by the continuous system data sources 102 and the discontinuous system data sources 112 for communicating, respectively, with the continuous data processor 104 and the discontinuous data processor 114. For example, the external data sources can measure ambient physical characteristics, such as temperature or seismic properties, or provide predictions about extreme temperatures, extreme winds, or seismic activity.

Figure 3:
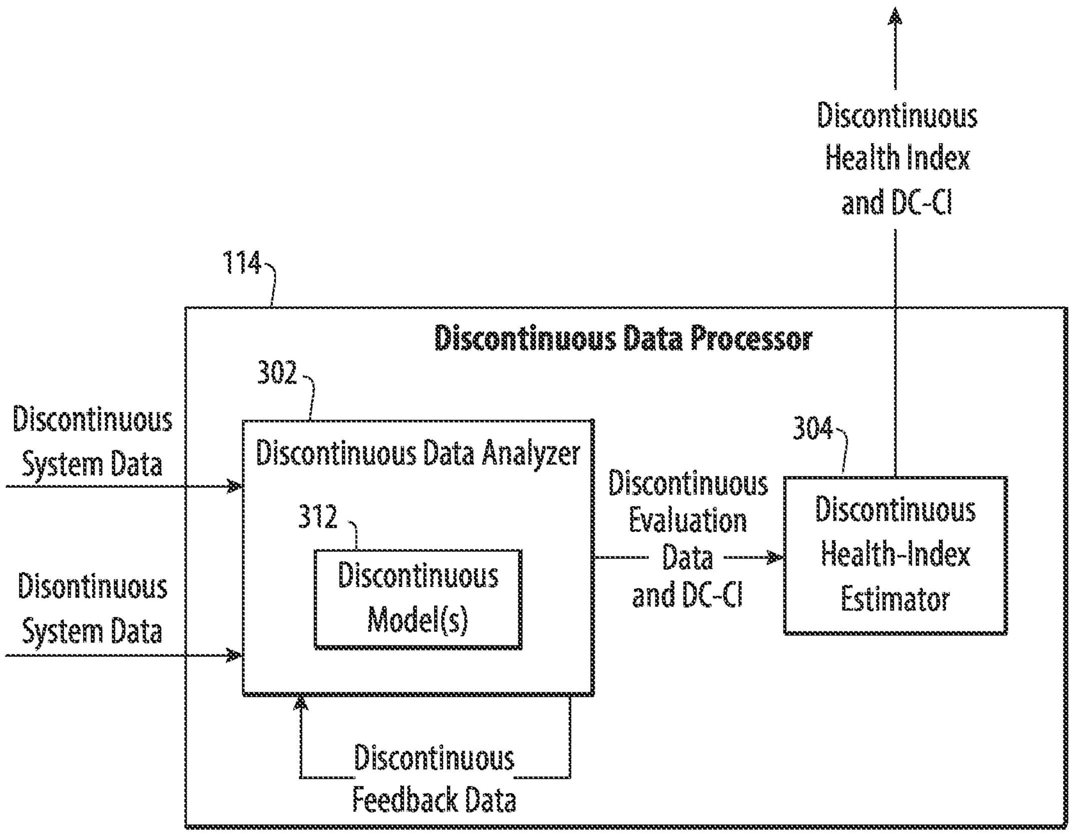
FIG. 3 is a block diagram illustrating an example discontinuous data processor shown in FIG. 1, in accordance with embodiments of the disclosure.

With reference to FIG. 3, discontinuous data processor 114 includes a discontinuous data analyzer 302 and a continuous health-index estimator. The continuous data analyzer 302 receives the discontinuous system data from the discontinuous system data sources 112. Discontinuous data analyzer 302 applies algorithms and/or models, such as discontinuous models 312, to the discontinuous system data and outputs discontinuous evaluation data. Techniques applied can include one or more of a least squares technique, a linear programming (LP) technique, a quadratic programming technique, a regression technique, a mixed integer linear programming technique, a mixed integer non-linear programming technique, etc. The discontinuous evaluation data can be provided as feedback to the discontinuous data analyzer 302, such as for detecting trends.

Discontinuous health-index estimator 304 processes the discontinuous evaluation data and transforms it into a discontinuous health index. The discontinuous health index can be a function of individual discontinuous health scores that correspond to respective discontinuous system data channels. The individual discontinuous health scores are a function of the discontinuous system data corresponding to the respective discontinuous system data channel, and in one or more embodiments can be a function of corresponding fault-free discontinuous system data. The discontinuous health index can be a quantitative (e.g., numerical) or (qualitative e.g., of a qualitative spectrum, such as excellent, good, fair, poor, or critical) value that represents health of the mechanical system. The discontinuous health index is provided in a predetermined format that is compatible with the combined health evaluator 120. Discontinuous health-index estimator 304 can be determined in real time as the discontinuous system data is received.

A discontinuous confidence indicator (DC-CI) is determined that indicates a level of confidence in the discontinuous system data and the discontinuous evaluation data determined therefrom. Techniques for determining the DC-CI can include, for example, statistical techniques, application of business rules, etc.

The DC-CI can be decreased, for example, when confidence is decreased due to discontinuous system data or trends in the discontinuous system data over time, as indicated by the discontinuous feedback data or feedback from the discontinuous evaluation data, that indicate a decrease in stability (e.g., an acceleration in a tendency towards values associated with instability) and/or unexpected variability detected in the discontinuous system data in view of historical discontinuous system data.

In an example of the former, the DC-CI can be affected by positive or negative changes in an envelope of range values for a combination of measurements of physical characters in the discontinuous system data that correlate with stability. The DC-CI can be increased when the discontinuous system data is consistent with expectations and/or the discontinuous system data is relatively high in resolution. The DC-CI can be decreased when the envelope diverges from stable conditions, the discontinuous system data is inconsistent with expectations, and/or the discontinuous system data is low in resolution.

The DC-CI can be provided as feedback to discontinuous data analyzer 302 to detect trends in the DC-CI, such as a decrease in DC-CI, which could be attributed to possible errors in the discontinuous system data or possible errors in the techniques used by discontinuous data analyzer 302 to analyze the discontinuous system data. As the DC-CI decreases (indicating a decrease in confidence of the discontinuous health index), next and subsequent calculations of the discontinuous health index can be decreased in importance, such as by adjusting a weight applied to the discontinuous health index for future calculations.

In an example of the latter, the DC-CI may be decreased when it is determined that recently measured discontinuous system data diverge logically from historical trends, as indicated by discontinuous feedback data. However, discontinuous crack indications or measurements should not diminish with time, as this would be illogical. A cause of such illogical behavior indicates that there is unwanted variability in the discontinuous system data, which indicates a lowering in confidence of the discontinuous system data and hence the discontinuous health index, as indicated by a decrease in the DC-CI.

Figure 4:
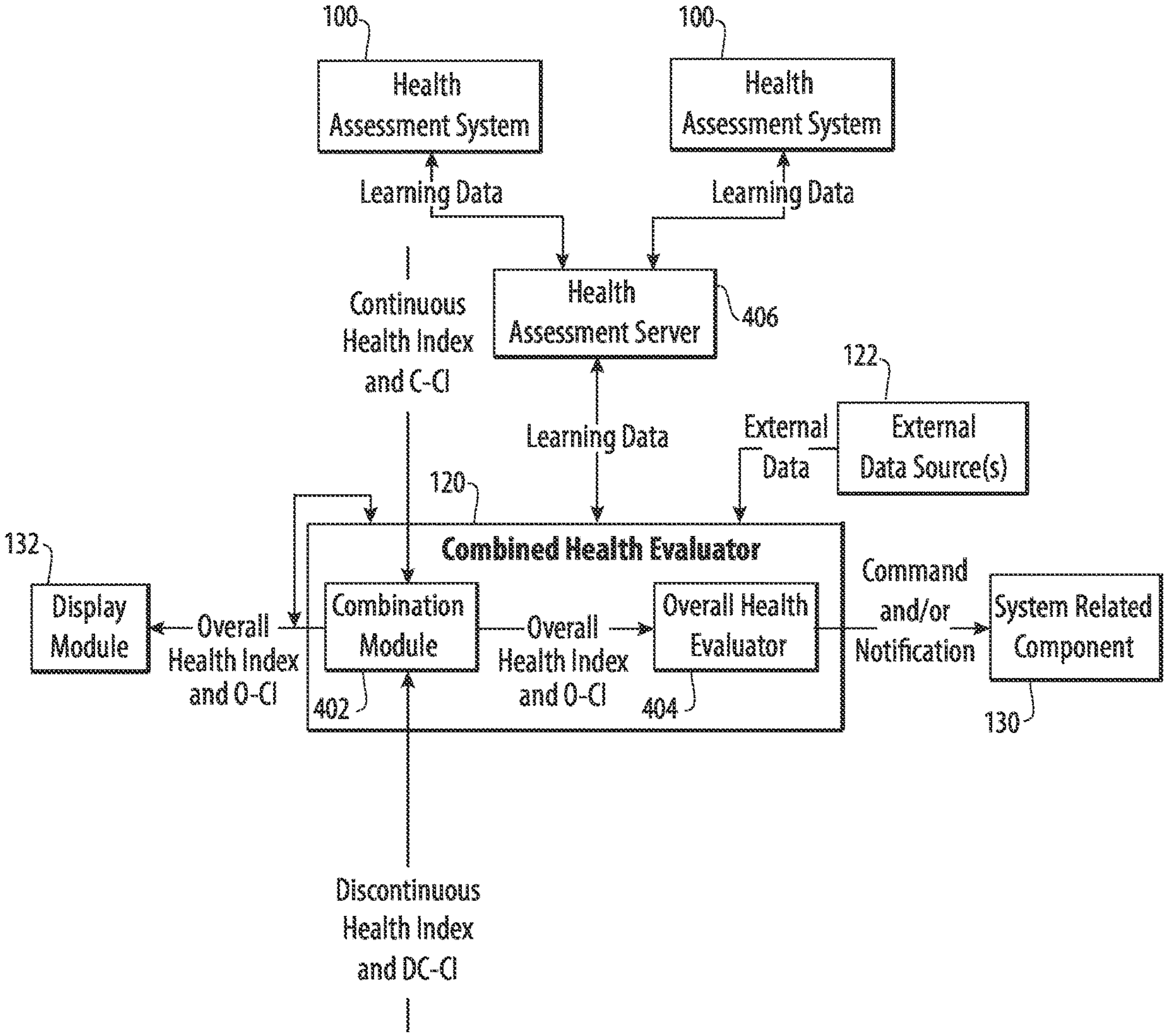
FIG. 4 is block diagram illustrating an example combined health evaluator shown in FIG. 1 in communication with other components of the health assessment system and/or with one or more other health assessment systems, in accordance with embodiments of the disclosure.

With reference to FIG. 4, combined health evaluator 120 includes a combination module 402 and an overall health evaluator 404. Combination module 402 receives the continuous and discontinuous health indexes and the associated respective C-CI and DC-CI and combines them into an overall health index with an associated overall confidence index (O-CI). The received continuous and discontinuous health indexes and C-CI and DC-CI can be stored as historical data.

In one or more embodiments, the continuous and discontinuous health indexes can be combined by applying a combinatorial method to determine the O-CI. The combinatorial method can utilize the most recent and/or one or more historical values of C-CI and DC-CI. When using multiple values of C-CI or DC-CI for determining O-CI, the multiple values can be combined using a combinatorial method, such as selection of a highest value, selection of a lowest value, and/or averaging, without limitation. When combining the C-CI and DC-CI to determine O-CI, a combinatorial method can be used, such as selection of a highest value, selection of a lowest value, and/or averaging, without limitation. Weights can be used when combining the C-CI and DC-CI for determining O-CI, such as for weighted averaging. The weights can be determined based on the C-CI and DC-CI values and/or trends in the C-CI and DC-CI values. For example, the weight applied to DC-CI could be decreased when DC-CI is below a threshold value, significantly less than C-CI, or DC-CI is trending downwards.

The continuous and discontinuous health indexes can be provided in the same predetermined format and scale to facilitate combination, or combination module 402 can perform a translation operation on continuous and/or discontinuous health indexes in order to facilitate the combination. Similarly, The DC-CI and C-CI can be provided in the same predetermined format and scale to facilitate combination, or combination module 402 can perform a translation operation on DC-CI and/or C-CI in order to facilitate the combination.

The combination of continuous and discontinuous health indexes and of C-CI and DC-CI are each performed by applying a combinatorial algorithm, without limitation to a particular algorithm. In one or more embodiments, the combinatorial algorithm can select a lowest or highest value to represent all of the values being combined, or weight selected values and combine all of the weighted and unweighted values being combined using an equation, such as an equation that computes mean or average.

In one or more embodiments, weights used by the combinatorial algorithm can be dynamic. For example, when the mechanical system is first deployed, the discontinuous system data may be sparse and may be weighted very lightly. Through time, as more discontinuous system data becomes available, the weight applied to the discontinuous health index can increase, such as to 50%. Conversely, the weight applied to the discontinuous health index can decrease if time between collections of the discontinuous system data increases.

In one or more embodiments, the overall health index can be a function of not only the most recent continuous and discontinuous health indexes, but can also be a function of stored historical continuous and/or discontinuous health indexes, thus using historical data to predict future health-related events.

Determination of an initial overall health index and associated O-CI or an update to the overall health index and O-CI can be triggered by performance of an inspection that results in receipt of new discontinuous system data by the discontinuous data processor or by receipt of an updated discontinuous health index by combined health evaluator 120.

The overall health index and associated O-CI can be provided to a display module 132 that can cause the overall health index and O-CI (and/or command or notification) to be displayed. The overall health index and O-CI can further be provided as feedback to the combination module to be used with the combinatorial methods used for determining the overall health index and/or O-CI. The combinatorial methods can utilize the most recent and/or one or more historical values of the overall health index and/or O-CI.

In one or more embodiments, the overall health index can be provided as feedback to combined health evaluator 120, such as to trigger commands and/or notifications based on changes in the overall health index. For example, in response to a determination that the overall health index is decreasing or has fallen below a threshold could include a recommendation to collection additional discontinuous system data, such as to add resolution to data collection or to add additional continuous or discontinuous system data sources. Another example response to a determination that the overall health index is decreasing or has fallen below a threshold could include derating (e.g., decreasing operational settings of) the mechanical system or temporarily removing power from the mechanical system to allow offline inspections.

In one or more embodiments, O-CI is based on reliability of the data used to determine the overall health index. For example, data reliability can be a function of the number of continuous and discontinuous system data sources (102 and 112) used to provide continuous and discontinuous system data to the respective continuous data processor 104 and discontinuous data processor 114. An increased number of continuous and/or discontinuous system data sources (102 and 112) used to provide continuous and/or discontinuous system data can increase C-CI and/or DC-CI, respectively, and can thus increase the value of O-CI. In another example, O-CI can be a function of a rate of change of a particular continuous or discontinuous system data channel (as indicated by C-CI and DC-CI), a corresponding continuous or discontinuous health score, and/or the continuous or discontinuous health index.

The overall health index and associated O-CI is provided to overall health evaluator 404. Overall health evaluator 404 applies an evaluation algorithm to determine whether to output a command or notification, e.g., to a system related component 130. Examples of system related components 130 and actions that are applied to the components include, for example and without limitation, a valve which is closed by the action, an alarm system that is activated by the action to alert individuals that an evacuation is underway, a continuous or discontinuous system data source (102 or 112) that is commissioned by the action to change its sensitivity (either higher for more granular data or lower due to nuisance alerts), a mechanism (e.g., pump or valve) which is bypassed by the action and replaced by a redundant mechanism, a mechanism for which a notification is sent to a supplier or mechanic to replace or provide servicing, etc. In one or more embodiments, the action can include a recommendation to perform an action on a particular component.

In one or more embodiments, overall health evaluator 404 can determine when to output a command and/or notification and/or the urgency of the command and/or notification based on trends of the overall health index and/or the O-CI. For example, when it is determined that a rate of change of the overall health index and/or the O-CI exceeds a threshold value, an action can be triggered. Multiple threshold values can be associated with respective different actions and levels of urgency.

In one or more embodiments, overall health evaluator 404 can apply, for example, statistical analysis, probabilistic analysis, machine learning, and/or numerical solver techniques to determine when to output a command and/or notification. The overall health index can be stored with its associated O-CI for a new mechanical system and stored as a baseline overall health index. When a failure occurs, the most recent overall health index and associated O-CI can be determined and stored as a failure overall health index. The O-CIs associated with each of the baseline and/or failure overall health indexes can be used to determine an updated overall health index.

Learning data, such as baseline and/or failure overall health indexes and their associated O-Cis can be aggregated from multiple health assessment systems 100, such as by a health assessment server 406, to provide aggregated learning data having an aggregated confidence index (A-CI). Furthermore, the aggregated learning data can be distributed to the health assessment systems 100. The A-CI can be increased or decreased by the health assessment server 406 based upon similarity or differences between baseline and/or failure overall health indexes received from the various health assessment systems 100.

Each time the overall health evaluator 404 evaluates overall health in real time (e.g., in response to receipt of new discontinuous system data) overall health evaluator 404 can compare the computed overall health index to the baseline and failure overall health indexes. The results of the comparison can be used to determine whether to send a command and/or notification. The determination whether to send a command and/or notification can be based on results of the comparison to the baseline and failure overall health indexes, as well as O-CI associated with the current overall health index that was determined in real time, the baseline overall health index, and/or the failure overall health index.

The command and/or notification can be adjusted based on the associated O-CI. For example, low O-CIs associated with the current and failure overall health indexes can result in provision of a notification with a weak recommendation. The recommendation can increase in strength as the associated O-CIs increase in strength and/or there is an increase in rate of change of the continuous, discontinuous, or overall health indexes. When the associated OCIs exceed a predetermined confidence threshold, the recommendation can be accompanied by a command that causes a strong action, such as a shutdown of a component and/or an alarm to evacuate.

When it is determined that an action needs to be taken, combined health evaluator 120 submits a command and/or notification to a system related component 130. For example, a command can be sent to shut down one or more components of the mechanical system. In another example, maintenance or servicing for a component of the mechanical system can be requested. In a further example, an alarm can be activated to warn individuals to evacuate the vicinity of the mechanical system. In still a further example, a command can be issued to commission additional continuous or discontinuous system data sources or to change settings (e.g., sensitivity or resolution) of an existing continuous system data source 102 and a discontinuous system data source 112.

External data from external data sources 122 can be received by combination module 402 and/or overall health evaluator 404. The combinatorial algorithm and/or the evaluation algorithm can be configured to use the external data for determining the respective overall health index, associated O-CI, and/or command and/or notification.

In an example, and without limitation to this particular example, the mechanical system is a pressurized vessel. Continuous data processor 104 can receive continuous system data from continuous system data sources 102 (as shown in FIG. 1), a historian that stores and provides historical continuous system data, one or more programmable logic controllers (PLCs), a supervisory control and data acquisition (SCADA) system, and/or a distributed control system (DCS). Discontinuous data processor 114 can receive pressure and video data and/or data from nondestructive testing (obtained by intermittent inspections) as discontinuous system data, as well as historical discontinuous system data. The combined health evaluator 120 combines the continuous and discontinuous health indexes received from the continuous data processor 104 and discontinuous data processor 114. When an overall health index is determined in real time that is similar to a baseline overall health index, the objective would be to maintain conditions as they are, and command and/or notifications may be neutral. When an overall health index is determined in real time that is similar to a failure overall health index, the objective of the command and/or notification would be to avoid a potential failure. The command and/or notifications may include urgent messages and/or actions.

Figure 5:
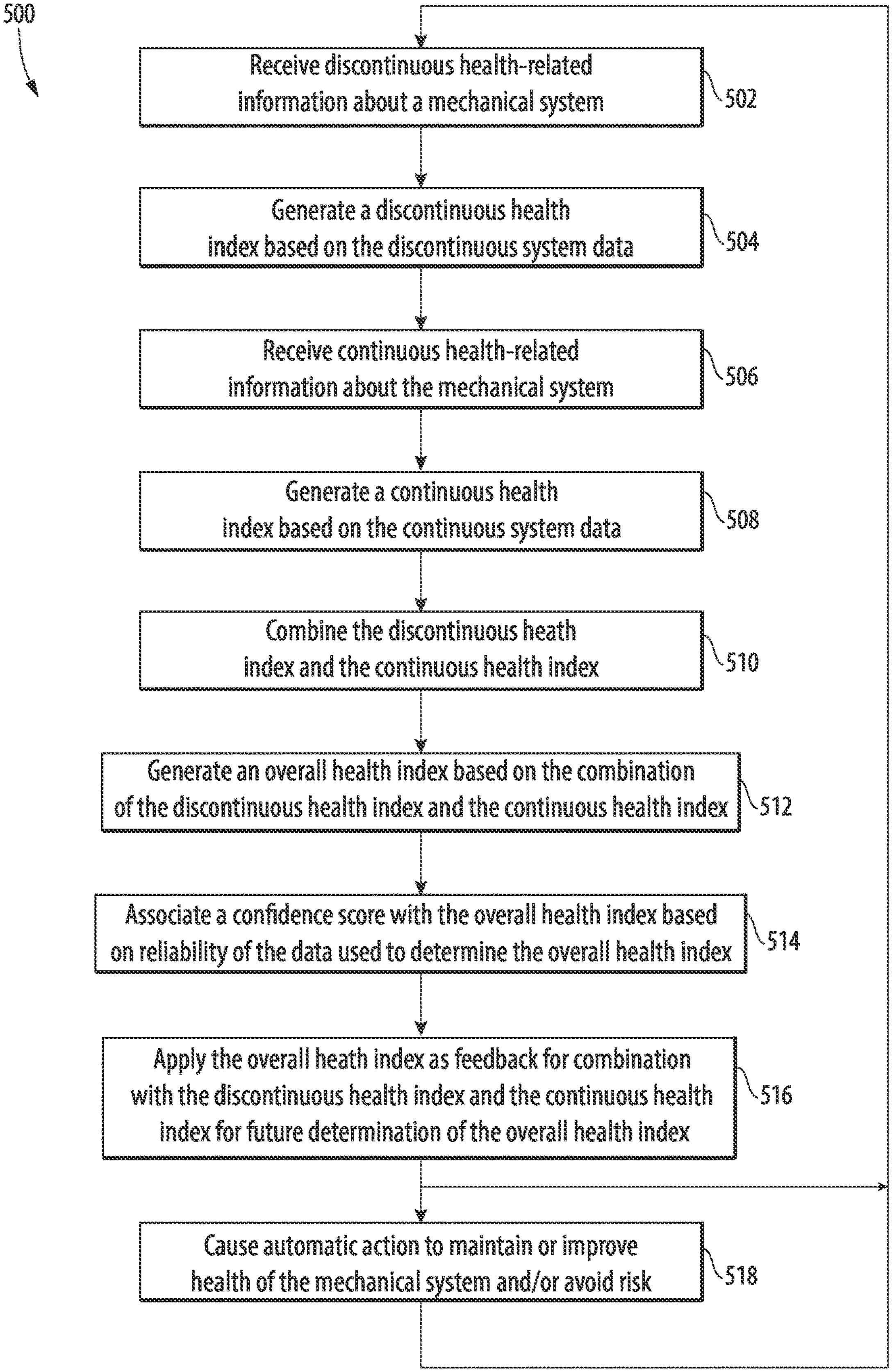
FIG. 5 is a flowchart of an example method of assessing health of a mechanical system, in accordance with embodiments of the disclosure.

FIG. 5 shows and exemplary and non-limiting flowchart illustrating a method for generating software applications, in accordance with certain illustrated embodiments. The example method can be performed by a health assessment system, such as health assessment system 100 shown in FIG. 1. Before turning to the description of FIG. 5, it is noted that the flowchart in FIG. 5 shows examples in which operational blocks are carried out in a particular order, as indicated by the lines connecting the blocks, but the various blocks shown in these flowcharts can be performed in a different order, or in a different combination or sub-combination. It should be appreciated that in some embodiments some of the blocks described below may be combined into a single block. In some embodiments, one or more additional blocks may be included. In some embodiments, one or more of the blocks can be omitted.

At block 502 discontinuous health-related information about a mechanical system is received. At block 504, a discontinuous health index is generated based on the discontinuous system data. At block 506, continuous health-related information about the mechanical system is received. At block 508, a continuous health index is generated based on the continuous system data. The discontinuous health index and continuous health indexes are configured to be combinable. At block 510, the discontinuous heath index and the continuous health index are combined, such as by applying a combinatorial algorithm. At block 512, an overall health index is generated based on the combination of the discontinuous health index and the continuous health index. In one or more embodiments, the overall health index can be represented as a score. At block 518, automatic action is caused to maintain or improve health of the mechanical system and/or avoid risk.

At block 514, in one or more embodiments, a confidence score can optionally be associated with the overall health index based on reliability of the data used to determine the overall health index. At block 516, in one or more embodiments, the overall heath index can optionally be applied as feedback for combination with the discontinuous health index and the continuous health index for future determination of the overall health index. For example, a previously determined overall health index as feedback can be combined with the discontinuous health index and the continuous health index for determining an updated overall health index.

In one or more embodiments, the discontinuous health index is updated in response to receipt of discontinuous system data as new discontinuous system data is received and the overall health index is updated in response to the update to the discontinuous health index.

Some examples of actions include adjusting the manner in which the discontinuous system data and/or the continuous system data is captured, performing an emergency shutdown of relevant equipment associated with the mechanical system to avoid the risk, and providing a notification to a system user or operator indicating a change in the assessment of the health of the mechanical system and/or a recommendation for responding to the change in the assessment of the health of the mechanical system.

Figure 6:
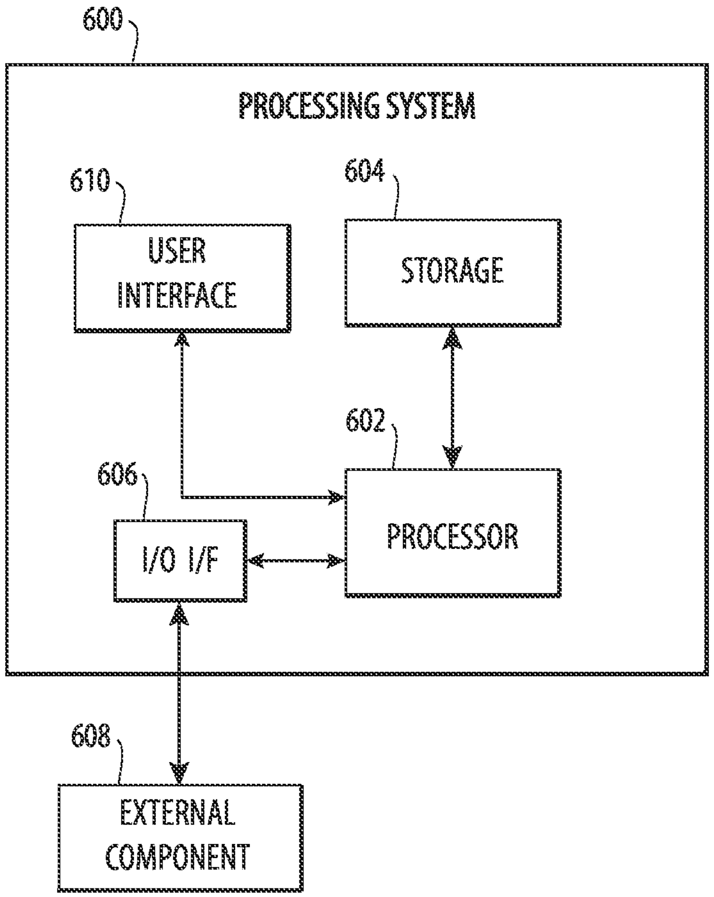
FIG. 6 is a block diagram of an exemplary computer system that implements components of the health assessment system shown in FIG. 1, in accordance with embodiments of the disclosure.

With reference to FIG. 6, a block diagram of an example computing system 600 is shown, which provides an example configuration of the processing components of health assessment system 100, namely continuous data processor 104, discontinuous data processor 114, and combined health evaluator 120. Additionally, all or portions of the processing components of health assessment system 100 could be configured as software, and computing system 600 could represent such portions. Computing system 600 is only one example of a suitable system and is not intended to suggest any limitation as to the scope of use or functionality of embodiments of the disclosure described herein. Computing system 600 can be implemented using hardware, software, and/or firmware. Regardless, computing system 600 is capable of being implemented and/or performing functionality as set forth in the disclosure.

Computing system 600 is shown in the form of a general-purpose computing device. Computing system 600 includes a processing device 602, memory 604, an input/output (I/O) interface (I/F) 606 that can communicate with an internal component, such as a user interface 610, and optionally an external component 608.

The processing device 602 can include, for example, a programmable logic device (PLD), microprocessor, DSP, a microcontroller, an FPGA, an ASIC, and/or other discrete or integrated logic circuitry having similar processing capabilities.

The processing device 602 and the memory 604 can be included in components provided in the FPGA, ASIC, microcontroller, or microprocessor, for example. Memory 604 can include, for example, volatile and non-volatile memory for storing data temporarily or long term, and for storing programmable instructions executable by the processing device 602. Memory 604 can be a removable (e.g., portable) memory for storage of program instructions. I/O I/F 606 can include an interface and/or conductors to couple to the one or more internal components 610 and/or external components 608.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flow diagram and/or block diagram block or blocks.

The computer program instructions may also be loaded onto a computer, other programmable data processing apparatus, or other devices to cause a series of operational operations to be performed on the computer, other programmable apparatus or other devices to produce a computer implemented process such that the instructions which execute on the computer or other programmable apparatus provide processes for implementing the functions/acts specified in the block diagram block or blocks.

Embodiments of the processing components of health assessment system 100 may be implemented or executed by one or more computer systems, such as a microprocessor. Each computer system 600 can be included within processing components of health assessment system 100, or multiple instances thereof. In the example shown, computer system 600 is embedded in the processing components of health assessment system 100. In various embodiments, computer system 600 may include one or more of a microprocessor, an FPGA, application specific integrated circuit (ASIC), microcontroller. The computer system 600 can be provided as an embedded device. Portions of the computer system 600 can be provided externally, such by way of a centralized computer, a data concentrator, a cockpit computing device controls display of gap status, e.g., notifications about the gap or alerts, or the like.

Computer system 600 is only one example of a suitable system and is not intended to suggest any limitation as to the scope of use or functionality of embodiments of the disclosure described herein. Regardless, computer system 600 is capable of being implemented and/or performing any of the functionality set forth hereinabove.

Computer system 600 may be described in the general context of computer system-executable instructions, such as program modules, being executed by a computer system. Generally, program modules may include routines, programs, objects, components, logic, data structures, and so on that perform particular tasks or implement particular abstract data types.

In the preceding, reference is made to various embodiments. However, the scope of the present disclosure is not limited to the specific described embodiments. Instead, any combination of the described features and elements, whether related to different embodiments or not, is contemplated to implement and practice contemplated embodiments. Furthermore, although embodiments may achieve advantages over other possible solutions or over the prior art, whether or not a particular advantage is achieved by a given embodiment is not limiting of the scope of the present disclosure. Thus, the preceding aspects, features, embodiments and advantages are merely illustrative and are not considered elements or limitations of the appended claims except where explicitly recited in a claim(s).

The various embodiments disclosed herein may be implemented as a system, method or computer program product. Accordingly, aspects may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects may take the form of a computer program product embodied in one or more computer-readable medium(s) having computer-readable program code embodied thereon.

Any combination of one or more computer-readable medium(s) may be utilized. The computer-readable medium may be a non-transitory computer-readable medium. A non-transitory computer-readable medium may be, for example, but not limited to, an electronic, magnetic, optical, electromagnetic, infrared, or semiconductor system, apparatus, or device, or any suitable combination of the foregoing. More specific examples (a non-exhaustive list) of the non-transitory computer-readable medium can include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. Program code embodied on a computer-readable medium may be transmitted using any appropriate medium, including but not limited to wireless, wireline, optical fiber cable, RF, etc., or any suitable combination of the foregoing.

Computer program code for carrying out operations for aspects of the present disclosure may be written in any combination of one or more programming languages. Moreover, such computer program code can execute using a single computer system or by multiple computer systems communicating with one another (e.g., using a local area network (LAN), wide area network (WAN), the Internet, etc.). While various features in the preceding are described with reference to flowchart illustrations and/or block diagrams, a person of ordinary skill in the art will understand that each block of the flowchart illustrations and/or block diagrams, as well as combinations of blocks in the flowchart illustrations and/or block diagrams, can be implemented by computer logic (e.g., computer program instructions, hardware logic, a combination of the two, etc.). Generally, computer program instructions may be provided to a processor(s) of a general-purpose computer, special-purpose computer, or other programmable data processing apparatus. Moreover, the execution of such computer program instructions using the processor(s) produces a machine that can carry out a function(s) or act(s) specified in the flowchart and/or block diagram block or blocks.

The flowchart and block diagrams in the Figures illustrate the architecture, functionality and/or operation of possible implementations of various embodiments of the present disclosure. In this regard, each block in the flowchart or block diagrams may represent a module, segment or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

It is to be understood that the above description is intended to be illustrative, and not restrictive. Many other implementation examples are apparent upon reading and understanding the above description. Although the disclosure describes specific examples, it is recognized that the systems and methods of the disclosure are not limited to the examples described herein, but may be practiced with modifications within the scope of the appended claims. Accordingly, the specification and drawings are to be regarded in an illustrative sense rather than a restrictive sense. The scope of the disclosure should, therefore, be determined with reference to the appended claims, along with the full scope of equivalents to which such claims are entitled.

I claim:

1. A method for assessing health of a mechanical system, the method comprising:

receiving, by using a discontinuous data processor and from one or more discontinuous system data sources, discontinuous system data that is obtained intermittently and is associated with the health of the mechanical system;

executing, by using the discontinuous data processor and the discontinuous system data, one or more first computer-implemented models to generate a discontinuous confidence indicator (DC-CI) indicative of a level of confidence in the discontinuous system data;

inputting, by using the discontinuous data processor, the DC-CI to the one or more first computer-implemented models as feedback to change a first weight to be applied to a discontinuous health index during a determination of an overall health index;

generating, by using the discontinuous data processor, the discontinuous health index that is based on the discontinuous system data and the first weight;

receiving, by using a continuous data processor and from one or more continuous system data sources, continuous system data that is obtained continuously and is associated with the health of the mechanical system;

executing, by using the continuous data processor and the continuous system data, one or more second computer-implemented models to generate a continuous confidence indicator (C-CI) indicative of a level of confidence in the continuous system data;

inputting, by using the continuous data processor, the C-CI to the one or more second computer-implemented models as feedback to change a second weight to be applied to a continuous health index during the determination of the overall health index;

generating, by using the continuous data processor, the continuous health index that is based on the continuous system data and the second weight;

generating, by using a combined health evaluator processor, the overall health index for overall health of the mechanical system based on a combination of the discontinuous health index and the continuous health index; and automatically causing, by using the combined health evaluator processor, one or more actions based on the overall health index, wherein the one or more actions include at least one of:

generating a first command to shutdown a component related to the mechanical system; or generating a second command to sound an alarm and/or flash at least one light to alert a person to evacuate a vicinity of the mechanical system.

2. The method of claim 1, further comprising capturing at least one of a group comprising the discontinuous system data and the continuous system data.

3. The method of claim 2, wherein the one or more actions further include adjusting a number of settings of the one or more discontinuous system data sources and/or the one or more continuous system data sources.

4. The method of claim 1, wherein the one or more actions further include providing a notification to a system user or operator indicating a change in the assessing of the health of the mechanical system and/or a recommendation for responding to the change in the assessing of the health of the mechanical system.

5. The method of claim 1, wherein the overall health index is represented as a score, and generating the overall health index further includes combining one or more previously determined overall health indexes, wherein generating the overall health index is based on the combination of the discontinuous health index, the continuous health index, and the one or more previously determined overall health indexes.

6. The method of claim 1, further comprising:

updating the discontinuous health index in real time in response to receipt of new discontinuous system data; and updating the overall health index in real time in response to the updating of the discontinuous health index.

7. The method of claim 1, wherein the DC-CI is indicative of a level of confidence in the discontinuous health index, the C-CI is indicative of a level of confidence in the continuous health index, and the method further comprising:

generating an overall confidence indicator (O-CI) that is a function of at least one of (i) the DC-CI or the C-CI, (ii) trends of at least one of the DC-CI or the C-CI, or (iii) one or more previously determined O-CIs, wherein a determination whether to automatically take the one or more actions and/or a selection of the one or more actions to be taken is based on the O-CI and/or changes in the O-CI.

8. The method of claim 1, wherein the first weight applied to the discontinuous health index and the second weight applied to the continuous health index are dynamically determined as a function of the DC-CI and the C-CI, respectively.

9. A health assessment system for assessing health of a mechanical system, the health assessment system comprising:

a discontinuous data processor configured to:

receive, from one or more discontinuous system data sources, discontinuous system data that is obtained intermittently and is associated with the health of the mechanical system;

execute, by using the discontinuous system data, one or more first computer-implemented models to generate a discontinuous confidence indicator (DC-CI) indicative of a level of confidence in the discontinuous system data;

input the DC-CI to the one or more first computer-implemented models as feedback to change a first weight to be applied to a discontinuous health index during a determination of an overall health index; and generate the discontinuous health index that is based on the discontinuous system data and the first weight;

a continuous data processor configured to:

receive, from one or more second continuous system data sources, continuous system data that is obtained continuously and is associated with the health of the mechanical system;

execute, by using the continuous system data, one or more second computer-implemented models to generate a continuous confidence indicator (C-CI) indicative of a level of confidence in the continuous system data;

input the C-CI to the one or more second computer-implemented models as feedback to change a second weight to be applied to a continuous health index during the determination of the overall health index; and generate the continuous health index that is based on the continuous system data and the second weight; and a combined health evaluator processor configured to:

generate the overall health index for overall health of the mechanical system based on a combination of the discontinuous health index and the continuous health index; and automatically cause one or more actions based on the overall health index, wherein the one or more actions include at least one of:

generating a first command to shutdown a component related to the mechanical system; or generating a second command to sound an alarm and/or flash at least one light to alert a person to evacuate a vicinity of the mechanical system.

10. The health assessment system of claim 9, wherein the one or more actions include at least one of a group comprising generating the first command, generating the second command, providing a first notification to a system user or operator to shutdown the component, providing a second notification to the system user or operator indicating a change in the assessing of the health of the mechanical system and/or a recommendation for responding to the change in the assessing of the health of the mechanical system, and adjusting a number of settings of the one or more discontinuous system data sources and/or the one or more continuous system data sources.

11. The health assessment system of claim 9, wherein the mechanical system is associated with an industrial process.

12. The health assessment system of claim 9, wherein the mechanical system includes a pressurized vessel.

13. The health assessment system of claim 12, wherein the pressurized vessel is a pulp digester associated with a paper manufacturing process.

14. The health assessment system of claim 9, wherein the overall health index is represented as a score, and the combined health evaluator processor is configured to combine a previously determined overall health index as feedback, wherein the combined health evaluator processor is configured to generate the overall health index based on the combination of the discontinuous health index, the continuous health index, and the previously determined overall health index.

15. The health assessment system of claim 9, wherein:

the discontinuous data processor is configured to update the discontinuous health index in real time in response to receipt of new discontinuous system data; and the combined health evaluator processor is configured to update the overall health index in real time in response to the update to the discontinuous health index.

16. The health assessment system of claim 9, wherein the DC-CI is indicative of a level of confidence in the discontinuous health index, the C-CI is indicative of a level of confidence in the continuous health index, and the combined health evaluator processor is configured to:

generate an overall confidence indicator (O-CI) that is a function of (i) at least one of the DC-CI or the C-CI and/or (ii) trends of at least one of the DC-CI or the C-CI, wherein a determination whether to automatically take the one or more actions and/or a selection of the one or more actions to be taken is based on the O-CI and/or changes in the O-CI.

17. At least one non-transitory computer readable storage medium comprising one or more computer programs stored therein, which when executed by at least one computer system, cause the at least one computer system to at least:

receive, by using a discontinuous data processor of the at least one computer system and from one or more discontinuous system data sources, discontinuous system data that is obtained intermittently and is associated with health of a mechanical system;

execute, by using the discontinuous data processor and the discontinuous system data, one or more first computer-implemented models to generate a discontinuous confidence indicator (DC-CI) indicative of a level of confidence in the discontinuous system data;

input, by using the discontinuous data processor, the DC-CI to the one or more first computer-implemented models as feedback to change a first weight to be applied to a discontinuous health index during a determination of an overall health index;

generate, by using the discontinuous data processor, the discontinuous health index that is based on the discontinuous system data and the first weight;

receive, by using a continuous data processor of the at least one computer system and from one or more continuous system data sources, continuous system data that is obtained continuously and is associated with the health of the mechanical system;

execute, by using the continuous data processor and the continuous system data, one or more second computer-implemented models to generate a continuous confidence indicator (C-CI) indicative of a level of confidence in the continuous system data;

input, by using the continuous data processor, the C-CI to the one or more second computer-implemented models as feedback to change a second weight to be applied to a continuous health index during the determination of the overall health index;

generate, by using the continuous data processor, the continuous health index that is based on the continuous system data and the second weight;

generate, by using a combined health evaluator processor of the at least one computer system, the overall health index for overall health of the mechanical system based on a combination of the discontinuous health index and the continuous health index; and automatically cause, by using the combined health evaluator processor, one or more actions based on the overall health index, wherein the one or more actions include at least one of:

generating a first command to shutdown a component related to the mechanical system; or generating a second command to sound an alarm and/or flash at least one light to alert a person to evacuate a vicinity of the mechanical system.

18. The method of claim 1, further comprising:

updating the continuous health index in real time in response to receipt of new continuous system data; and updating the overall health index in real time in response to the updating of the continuous health index.

19. The health assessment system of claim 9, wherein:

the continuous data processor is configured to update the continuous health index in real time in response to receipt of new discontinuous system data; and the combined health evaluator processor is configured to update the overall health index in real time in response to the update to the discontinuous health index.

20. The method of claim 1, wherein the one or more actions further include providing a notification to a system user or operator to shutdown the component related to the mechanical system.

* * * * *